(12) United States Patent
Hokari

(10) Patent No.: US 7,353,526 B2
(45) Date of Patent: Apr. 1, 2008

(54) OPTICAL INFORMATION STORAGE APPARATUS AND OPTICAL INFORMATION STORAGE SYSTEM

(75) Inventor: Mamoru Hokari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 11/088,281

(22) Filed: Mar. 23, 2005

(65) Prior Publication Data
US 2005/0193406 A1 Sep. 1, 2005

Related U.S. Application Data

(63) Continuation of application No. PCT/JP03/06864, filed on May 30, 2003.

(51) Int. Cl.
G11B 33/14 (2006.01)
(52) U.S. Cl. ..................................... 720/649
(58) Field of Classification Search .............. 720/649, 720/648
See application file for complete search history.

(56) References Cited

U.S. PATENT DOCUMENTS 5,493,457 A * 2/1996 Kawamura et al. ......... 720/648
6,040,981 A * 3/2000 Schmitt et al. ............. 361/695
6,639,886 B1 * 10/2003 Cook et al. ................. 720/649
6,880,162 B2 * 4/2005 Takagi et al. ............... 720/649

FOREIGN PATENT DOCUMENTS

| JP | 63-004483 | 1/1988 |
|---|---|---|
| JP | 4-195885 | 7/1992 |
| JP | 5-054513 | 3/1993 |
| JP | 5-074127 | 3/1993 |
| JP | 5-114155 | 5/1993 |
| JP | 7-201082 | 8/1995 |
| JP | 7-235120 | 9/1995 |
| JP | 9-146660 | 6/1997 |
| JP | 2000-057077 | 2/2000 |
| JP | 2001-093121 | 4/2001 |

* cited by examiner

Primary Examiner—Angel Castro
(74) Attorney, Agent, or Firm—Greer, Burns & Crain, Ltd.

(57) ABSTRACT

The object of the present invention is to provide an optical information storage apparatus and an optical information storage system with a mass-storage capacity in which adhesion of dust to an optical storage medium or an objective lens is suppressed. According to the present invention, a system housing contains an optical information storage apparatus that includes: an inflow section into which air flows from outside a blade housing integrally retaining a media storing section, a medium moving section and a recording/reproducing section; and an outflow section from which the air flowing into the inflow section flows out to outside the blade housing. The system housing also contains a blower that sends air to the inflow section.

7 Claims, 7 Drawing Sheets

OPTICAL INFORMATION STORAGE APPARATUS AND OPTICAL INFORMATION STORAGE SYSTEM

This is a continuation of International Application No. PCT/JP03/06864, filed May 30, 2003.

TECHNICAL FIELD

The present invention relates to an optical information storage apparatus that records and reproduces information on and from an optical storage medium on which at least information reproduction is performed by means of light, and an optical information storage system constituted by integrating multiple optical information storage apparatuses.

BACKGROUND ART

Considering the recent rapid progress of the information communication industry, the amount of data, such as transaction information and data for homepages, which is communicated on a communication network represented by the Internet, is expected to drastically increase in the near future. In order to cope with such drastic increase in the data amount, a mass storage apparatus is in great demand.

As an information storage apparatus which has gotten a lot of attention recently, there is an optical information storage apparatus that stores information by means of an optical storage medium represented by an MO, a DVD and the like. Such an optical information storage apparatus is required to have a drastically increased capacity to cope with the drastic data amount increase expected in the near future. As techniques for achieving a mass-storage capacity of the optical information storage apparatus, there have been proposed utilization of a blue laser diode as a light source for recording and reproduction on and from an optical storage medium, recording to both sides of a disk-like optical storage medium, increase of NA in the objective lens of a recording head, and the like.

Among these techniques, the increase of NA in the objective lens of a recording head is an effective technique to achieve a mass-storage capacity of an optical information storage apparatus. However, the increase of NA in the objective lens causes the following problem.

For example, if NA in the objective lens is increased without changing the aperture of the objective lens, the focal distance of the objective lens is shortened. In such a case, it is necessary to bring the recording surface of an optical storage medium close to the objective lens. As a result, it is inevitably required to make the gap between the optical storage medium and the objective lens shorter and furthermore to make the thickness of the medium protection film covering the recording surface of the optical storage medium thinner. For example, in the case of a generally distributed optical information storage apparatus that stores information in a CD, the gap between the CD and the objective lens is 1 mm or more, and the thickness of the medium protection film of the CD is about 1.2 mm. On the other hand, if NA in the objective lens is increased as described above, the gap between the optical storage medium and the objective lens is as short as 0.1 mm or below, and the medium protection film of the optical storage medium is as thin as 0.1 mm or less. For example, if dust adheres to the surface of the medium protection film, this causes a possibility that the dust may intercept the path of light irradiated from the recording head and focused on the recording surface. If the medium protection film is thin, the surface of the medium protection film is close to the focal point on the recording surface. Therefore, on the surface of this medium protection surface, the light emitted from the recording head is sufficiently narrowed by the objective lens. As a result, even if the size of the dust adhering to the surface of the medium protection film is very small, a part intercepted by the dust, of the light transmitted through the surface of the medium protection film is large. Furthermore, when the gap between the optical storage medium and the objective lens is short, if a relatively large-sized piece of dust is allowed to go to the vicinity of the gap, it may happen that the dust stays between the optical storage medium and the objective lens, intercepts the light emitted from the recording head for a long time and gives serious damage to reading and writing of information from and on the optical storage medium. Thus, the increase of NA in an objective lens may cause a problem that the resistance against dust adhering to the optical recording medium and the objective lens is reduced.

In order to cope with such dust, there have been proposed a technique of cleaning an optical system and a carrying system with the use of a cleaning disk (see Patent Document 1, Patent Document 2, Patent Document 3, Patent Document 4, Patent Document 5 and Patent Document 6, for example), a technique of providing a drive for cleaning in parallel with a drive for recording and reproduction to clean an optical storage medium (see Patent Document 7 and Patent Document 8, for example), and so on.

(Patent Document 1)
Japanese Patent Laid-Open No. 13-93121
(Patent Document 2)
Japanese Patent Laid-Open No. 5-54513
(Patent Document 3)
Japanese Patent Laid-Open No. 5-74127
(Patent Document 4)
Japanese Patent Laid-Open No. 5-114155
(Patent-document 5)
Japanese Patent Laid-Open No. 7-235120
(Patent Document 6)
Japanese Patent Laid-Open No. 12-57077
(Patent Document 7)
Japanese Patent Application No. 5-74127
(Patent Document 8)
Japanese Patent Application No. 5-114155

However, as shown in the Patent Documents 1 to 8, there is a problem that, if a cleaning mechanism is provided within an optical information storage apparatus, the size of the apparatus is large. Furthermore, there is also a problem that the optical storage medium may be damaged due to an unexpected accident caused by providing such a cleaning mechanism.

DISCLOSURE OF THE INVENTION

In consideration of the above situation, the object of the present invention is to provide an optical information storage apparatus and an optical information storage system with a mass-storage capacity in which adhesion of dust to an optical storage medium or an objective lens is suppressed.

An optical information storage system of the present invention that achieves the above object includes: plural optical information storage apparatuses, each of which including a media storing section in which is plurally contained a disk-like optical storage medium on which recording and reproduction of information is possible and at least information reproduction is performed by means of light, a recording/reproducing section that records and/or reproduces information on and/or from the optical storage medium, a medium moving section that moves the optical storage medium between the media storing section and the recording/reproducing section, a blade housing that integrally holds the media storing section, the medium moving section and the recording/reproducing section arranged in line therein, an inflow section that is provided on an end part on the recording/reproducing section side of the blade housing and allows air to flow in from outside the blade housing, a filter that suppresses ingress of dust via the inflow section, and an outflow section that is provided on an end part on the media storing section side of the blade housing and allows air flowing from the recording/reproducing section toward the media storing section in the blade housing to flow to outside the blade housing;

a system housing that contains the plurality of optical information storage apparatuses and detachably holds the plurality of optical information storage apparatuses;

a control section that controls recording and/or reproduction of information on each of the plurality of optical information storage apparatuses contained in the system housing;

a blower that sends air; and a pipe that leads the air sent by the blower to the inflow section of each of the plurality of optical information storage apparatuses contained in the system housing.

According to the optical information storage system of the present invention, by constantly sending air to the inflow section of each optical information storage apparatus from the blower via the pipe and removing dust from the air by means of the filter to fill the optical information storage apparatus with clean air, and thereby constantly keeping positive pressure inside each optical information storage apparatus, it is possible to suppress ingress of dust from the inflow section, for example. If the blade housing is configured to detachably hold the media storing section to enable maintenance to be performed or the capacity of the optical information storage system to be increased, for example, there is a possibility that a gap is generated between the blade housing and the media storing section. According to the optical information storage system of the present invention, positive pressure is constantly kept inside the optical information storage apparatus, and therefore, if the optical information storage apparatus has a gap open toward the outside, such as the gap between the blade housing and the media storing section, an air flow is generated which flows toward the outside through the gap. Due to this air flow, ingress of dust through the gap can be suppressed.

Furthermore, according to the optical information storage system of the present invention, the capacity of the optical information storage system can be easily increased by increasing the number of optical storage media contained in the media storing section. In this case, however, when works such as removal of the media storing section from the optical information storage apparatus are required, and it is anticipated that dust enters the optical information storage apparatus from the media storing section side during the works. However, according to the optical information storage system of the present invention, when the optical information storage apparatus is contained in the system housing, the air sent into each optical information storage apparatus is constantly flows from the recording/reproducing section toward the media storing section in the optical information storage apparatus, and therefore, even if dust enters the optical information storage apparatus during the works, the dust can be inhibited by the air flow from adhering to the optical system and the like of the recording/reproducing section arranged at the upstream of the air flow.

In the optical information storage system of the present invention, preferably, the optical information storage apparatus is provided with an opening and closing section that closes the inflow section when the optical information storage apparatus is removed from the system housing and opens the inflow section when the optical information storage apparatus is contained in the system housing.

According to the optical information storage system of this structure, when the optical information storage apparatus is removed from the system housing, the inflow section can be closed to block ingress of dust from the inflow section.

Also, in the optical information storage system of the present invention, preferably, the optical information storage apparatus is provided with a filter that suppresses ingress of dust into the blade housing via the outflow section.

According to the optical information storage system of this structure, when positive pressure is not kept inside the optical information storage apparatus for the reason that the optical information storage apparatus is removed from the system housing or other such reasons, ingress of dust via the outflow section can be suppressed by means of the filter.

An optical information storage apparatus of the present invention that achieves the above object is an optical information storage apparatus that records and/or reproduces information to and/or from a disk-like optical storage medium on which recording and reproduction of information is possible and at least information reproduction is performed by means of light, the optical information storage apparatus including:

a media storing section in which a disk-like optical storage medium is plurally contained;

a recording/reproducing section that records and/or reproduces information to and/or from the optical storage media, a medium moving section that moves the optical storage media between the media storing section and the recording/reproducing section, a blade housing that integrally holds the media storing section, the medium moving section and the recording/reproducing section arranged in line therein;

a connecting section that detachably connects the optical information storage apparatus to a system housing in which a plurality of the optical information storage apparatuses are contained;

an inflow section that is provided on an end part on the recording/reproducing section side of the blade housing and allows air to flow in from outside the blade housing;

a filter that suppresses ingress of dust via the inflow section; and an outflow section that is provided on an end part on the media storing section side of the blade housing and allows air flowing from the recording/reproducing section toward the media storing section in the blade housing to flow out.

According to the optical information storage apparatus of the present invention, it is possible to obtain an effect of suppressing ingress of dust from the outside of the optical information storage apparatus or adhesion of dust to the optical system inside the optical information storage apparatus, similarly to the optical information storage apparatus of the optical information storage system described above, for example, by constantly sending air to the inflow section.

In the optical information storage apparatus of the present invention, preferably, the system housing is provided with a blower system that sends air to the inflow section of each of the plurality of optical information storage apparatuses contained in the system housing;

the inflow section is detachably connected to the blower system; and the optical information storage apparatus is provided with an opening and closing section that closes the inflow section when the inflow section is disconnected from the blower system and opens the inflow section when the inflow section is connected to the blower system.

According to the optical information storage apparatus of this structure, when the inflow section of the optical information storage apparatus is disconnected from the blower system, the inflow section can be closed to block ingress of dust from the inflow section.

Also, preferably, the optical information storage apparatus of the present invention is provided with a blower that sends air to the inflow section.

According to the optical information storage apparatus of this structure, it is possible to constantly send air to the inflow section by the blower and thereby constantly keep positive pressure inside the blade housing to suppress ingress of dust into the inside of the blade housing.

Furthermore, preferably, the optical information storage apparatus of the present invention is provided with a filter that suppresses ingress of dust into the blade housing via the outflow section.

According to the optical information storage apparatus of this structure, if positive pressure is not kept inside the optical information storage apparatus, for example, ingress of dust via the outflow section can be suppressed by the filter.

BEST MODE FOR CARRYING OUT THE INVENTION

Embodiments of the present invention will be now described below. In the description below, "information" and "data" are used without being distinguished from each other in some cases.

Figure 1:
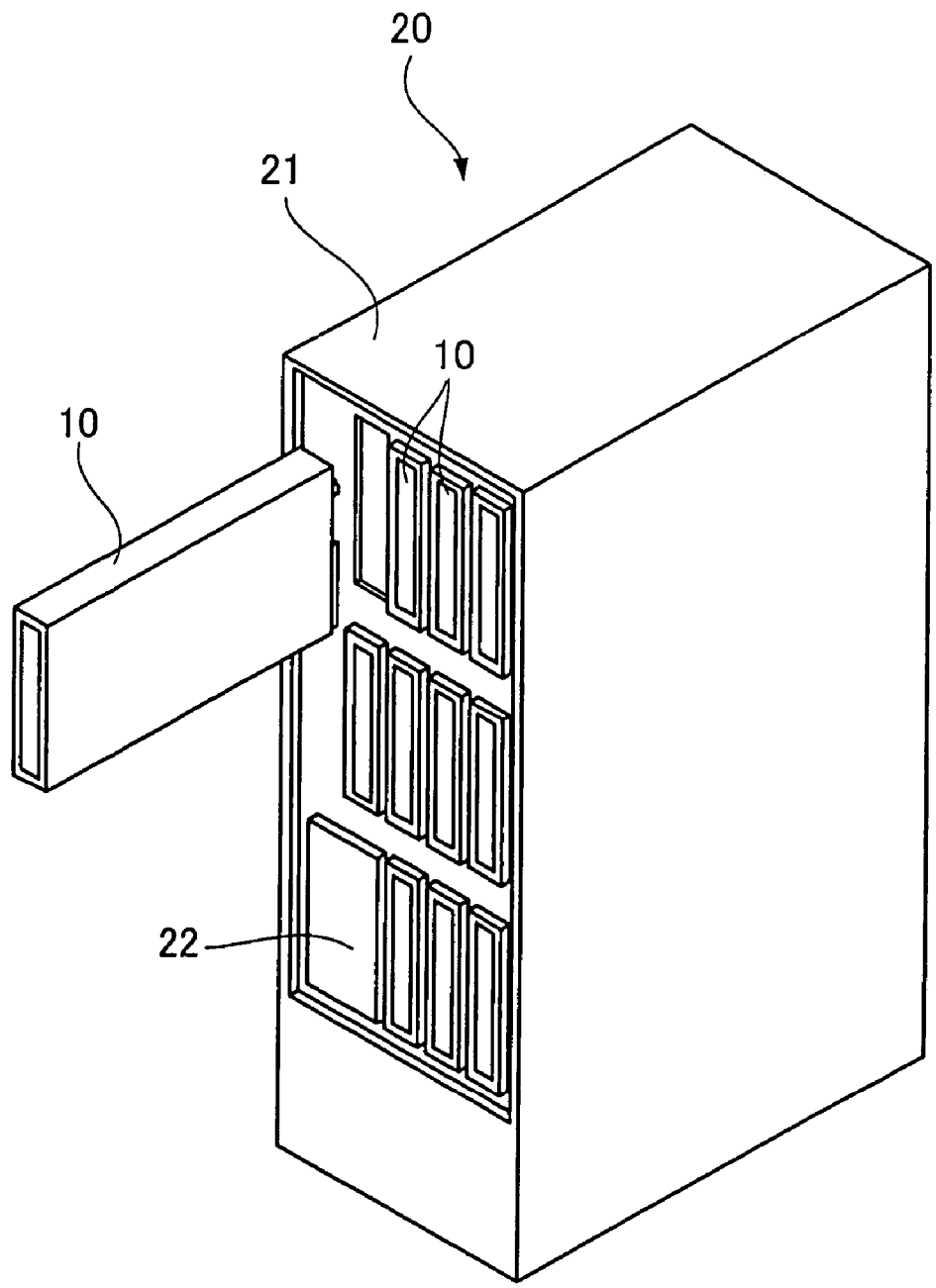
FIG. 1 is an external view of a first embodiment of each of an optical information storage system and an optical information storage apparatus of the present invention.

FIG. 1 is an external view of a first embodiment of each of an optical information storage system and an optical information storage apparatus of the present invention.

FIG. 1 shows a blade apparatus 10 corresponding to an embodiment of the optical information storage apparatus of the present invention, in which magneto-optic (MO) disks are used as the optical storage medium according to the present invention, as an example, and a collective system 20 corresponding to an embodiment of the optical information storage system of the present invention, in which multiple blade apparatuses 10 (eleven blade apparatuses 10 in this figure) are incorporated.

The multiple blade apparatuses 10 are releasably contained in a system housing 21 of the collective system 20.

The collective system 20 is also provided with a control device 22 for controlling recording and reproduction of information on and from each of the multiple blade apparatuses 10.

The collective system 20, in which the multiple blade apparatuses 10 are compacted in the system housing 21, is a compact mass-storage system. Furthermore, it is possible to increase the capacity by increasing the number of blade apparatuses 10, and it is also possible to easily perform maintenance by detaching or exchanging the blade apparatuses.

Figure 2:
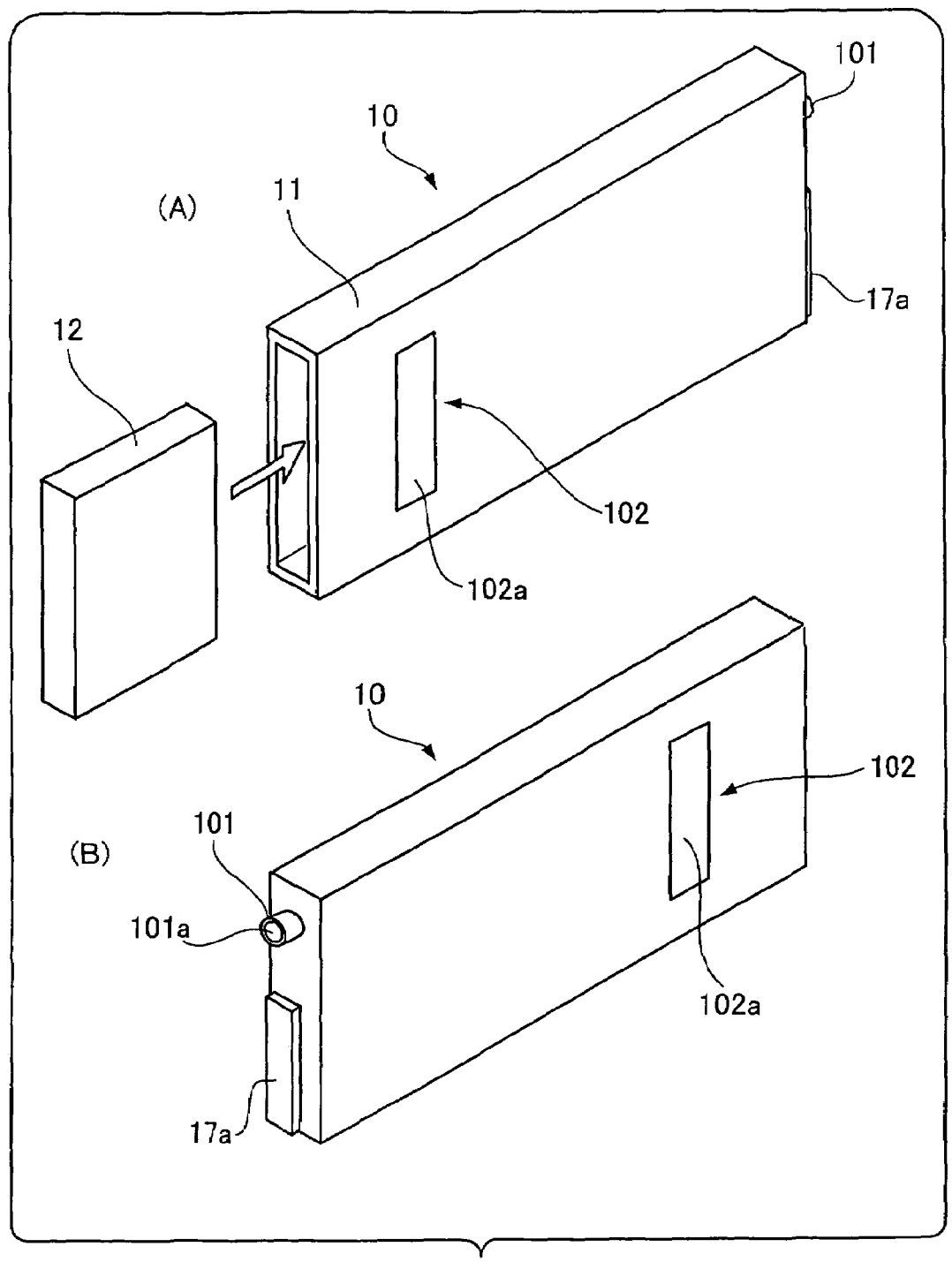
FIG. 2 is an external view of the blade housing of a blade apparatus shown in FIG. 1.

FIG. 2 is an external view of the blade housing of the blade apparatus shown in FIG. 1.

Part (A) of FIG. 2 schematically shows that a magazine 12 containing multiple MO disks is releasably contained in a blade housing 11 of the blade apparatus 10. The magazine 12 corresponds to the media storing section according to the present invention. Part (B) of FIG. 2 shows a perspective view in which the blade apparatus 10 is seen from the back side opposite to the front side where the magazine 12 is inserted.

The blade housing 11 has a length 2.5 times the diameter of an MO disk, a width (a height in this figure) a little larger than the diameter of an MO disk and a thickness (a width in this figure) considerably shorter than the diameter of an MO disk, and at one end of the blade housing 11, the magazine 12 containing multiple MO disks is detachably arranged. The magazine 12 is detachable even when the blade apparatus 10 is inserted in the system housing 21 of the collective system 20 shown in FIG. 1. Accordingly, the capacity of the collective system 20 shown in FIG. 1 can be easily increased by increasing the number of MO disks contained in the magazine 12, and it is possible to perform maintenance for the collective system 20 by detaching or exchanging the magazine 12.

On the back side of the blade apparatus 10, there are provided an air inflow section 101 and a connector 17a which is an interface responsible for data transfer with the outside. At the front side part on a side surface of the blade apparatus 10 is provide with an air outflow section 102. The inflow section 101 is provided with a filter 101a detachable from the outside, which suppresses ingress of dust via the inflow section 101. The outflow section 102 is also provided with a filter 102a detachable from the outside, which suppresses ingress of dust via the outflow section 102. Since the filter 101a of the inflow section 101 and the filter 102a of the outflow section 102 are detachable from the outside of the blade apparatus 10, each of them can be periodically replaced with new one.

In this embodiment, when the blade apparatus 10 is contained in the system housing 21 (see FIG. 1), air is constantly sent to the inflow section 101 as described later. Since dust is removed from the air by the filter 101a then, the blade apparatus 10 is always filled with clean air, and positive pressure is constantly kept inside the blade apparatus 10. As a result, ingress of dust through the gap between the blade housing 11 and the magazine 12 and the like is suppressed.

Figure 3:
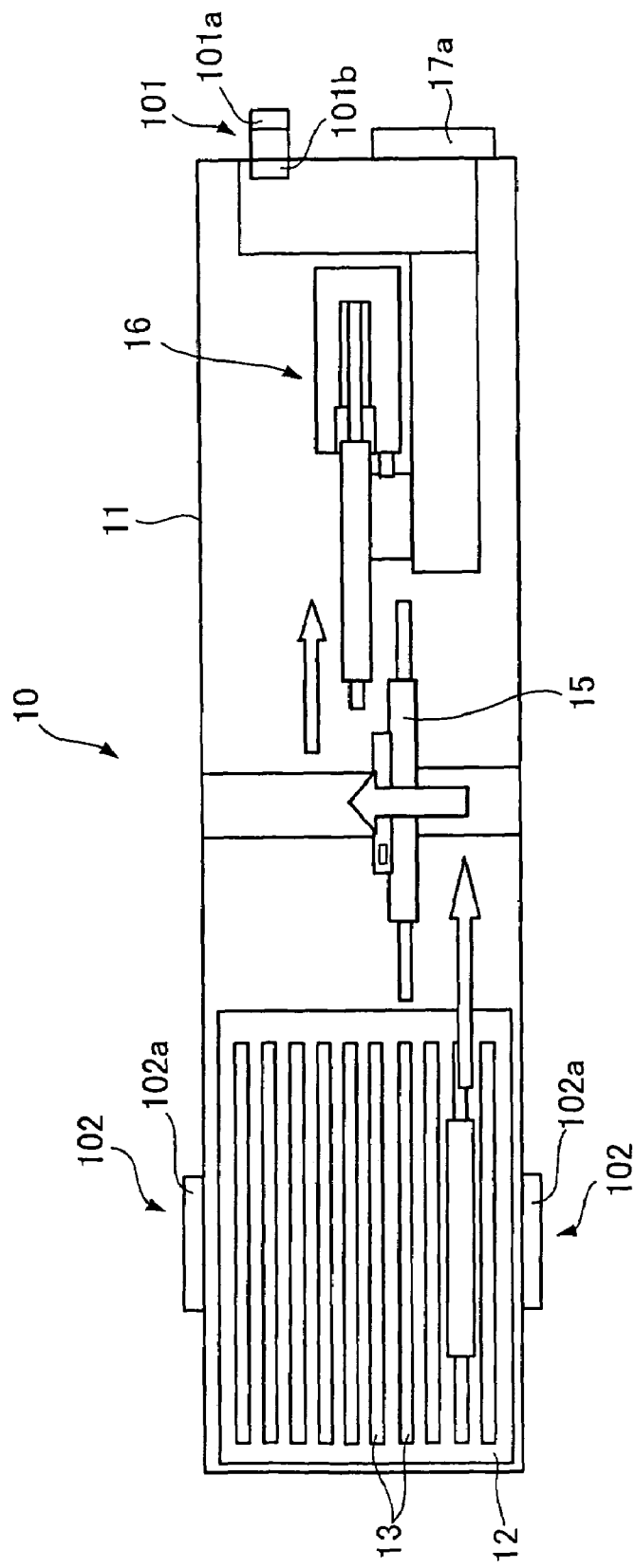
FIG. 3 shows the hardware structure of a blade apparatus.

FIG. 3 shows the hardware structure of the blade apparatus.

The blade apparatus 10 has the magazine 12 described above and a drive 16 for performing recording and reproduction of information on and from MO disks 13 which are contained in the blade housing 11. Between the magazine 12 and the drive 16, there is provided a changer 15 for moving the MO disk 13 between the magazine 12 and the drive 16. The drive 16 corresponds to an example of the recording/ reproducing section according to the present invention, and the changer 15 corresponds to an example of the medium moving section according to the present invention.

As described above, the blade apparatus 10 has the magazine 12, the changer 15 and the drive 16 which are compacted in the blade housing 11, and its storage capacity can be easily increased by increasing the number of MO disks 13 if there is a space in the magazine 12. Furthermore, it is also possible to easily perform maintenance by detaching or exchanging the magazine 12 or the MO disk 13.

At the other end opposite to the end where the magazine 12 is arranged, the blade apparatus 10 is provided with the connector 17*a* which is an interface responsible for data transfer between the blade apparatus 10 and the outside. When the blade apparatus 10 is inserted into the system housing 21 of the collective system 20 shown in FIG. 1, the connector 17*a* is connected to a connector of the collective system 20.

The changer 15 has a function of inserting and releasing the MO disk 13 into and from the magazine 12, a function of moving the MO disk 13 in a vertical direction relative to the figure and a function of mounting and removing the MO disk 13 on and from the drive 16.

On the back side of the blade apparatus 10, on which the connector 17*a* is provided, the inflow section 101 for allowing air to flow in therethrough is provided. On both sides of the blade apparatus 10 and next to the magazine 12, the outflow sections 102 for allowing the air to flow out therethrough are provided. The inflow section 101 is equipped with the filter 101*a* for suppressing ingress of dust from the inflow section 101 and an opening/closing valve 101*b* for opening the inflow section 101 when the blade apparatus 10 is contained in the system housing 21 shown in FIG. 1 and closing the inflow section 101 when the blade apparatus is removed from the system housing 21. The outflow section 102 is equipped with the filter 102*a* for suppressing ingress of dust from the outflow section 102.

In this embodiment, it is anticipated that dust enters the blade apparatus 10 from the magazine 12 side when the magazine 12 is released from and inserted into the blade apparatus 10 when a work for increasing the capacity or a work for maintenance as described above. However, in this embodiment, the air sent from the inflow section 101 constantly flows from the drive 16 toward the magazine 12 in the blade apparatus 10. The optical system and the like which are sensitive to dust are arranged at the upstream of the point of ingress of dust in the air flow as described later, and therefore, even if dust enters the blade apparatus 10 during the works, adhesion of the dust to the optical system and the like can be suppressed by the air flow.

Furthermore, the air sent from the inflow section 101 plays a role of cooling each of the sections in the blade apparatus 10, which are to be described later, by going through the blade apparatus 10.

Figure 4:
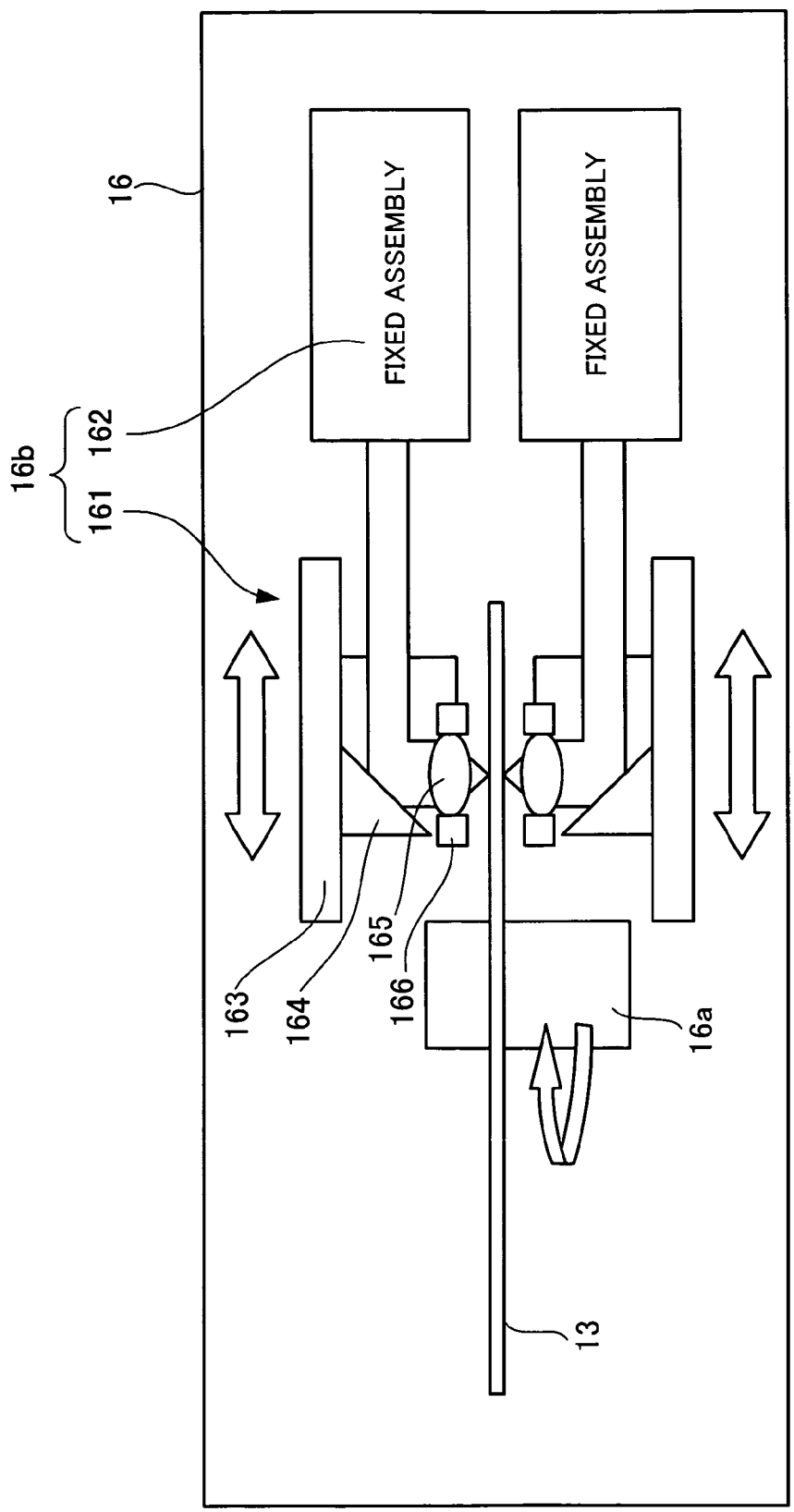
FIG. 4 shows the hardware structure of a drive.

The drive 16 is provided with two heads 16*b*, and FIG. 4 shows the structure around the two heads 16*b*. The two heads 16*b* are arranged so that the MO disk 13 held and rotated by a spindle motor 16*a* is interposed between them. Each of the heads 16*b* includes a laser diode, a light sensing element and various kinds of optical elements and constituted by a fixed assembly 162 that is responsible for generation of a laser beam for recording and reproduction as well as responsible for detection of reproduction data, and a movable assembly (carriage) 161 which moves on a predetermined rail to emit the laser beam onto a desired position on the MO disk 13 and returns light reflected by the MO disk 13 to the fixed assembly 162. Furthermore, the movable assembly (carriage) 161 is provided with a carriage base 163, a raising mirror 164 that reflects a laser beam, a condenser lens 165 that condenses the laser beam on the MO disk 13, and a lens actuator 166 that moves the condenser lens 165.

In this case, in this embodiment, the condenser lens 165 with increased NA is used in order to perform high-density information recording on the MO disk 13. Accordingly, the gap between the MO disk 13 and the condenser lens 165 is as short as 0.1 mm or below. Furthermore, a media protection film with thickness as thin as 0.1 mm or below is used on the MO disk 13. As described above, if dust adheres to the condenser lens 165 or the MO disk 13, a part intercepted by the dust, of a laser beam emitted onto the recording surface of the MO disk 13 is considerably large in comparison with the case where dust adheres to a CD and the like. Therefore, in this embodiment, by constantly keeping positive pressure inside the blade housing 11 to prevent ingress of dust into the blade housing 11 itself, as described above with reference to FIG. 2, adhesion of dust to the condenser lens 165 or the MO disk 13 is suppressed. Dust which enters the blade housing 11 when the magazine 12 is released from or inserted into the blade apparatus 10 to increase the capacity or perform maintenance is positioned at the downstream of the air flow which is generated and flows from the drive 16 toward the magazine 12 in the blade apparatus 10 as described above with reference to FIG. 3. As a result, adhesion of the dust to the condenser lens 165 and the MO disk 13 can be suppressed.

Figure 5:
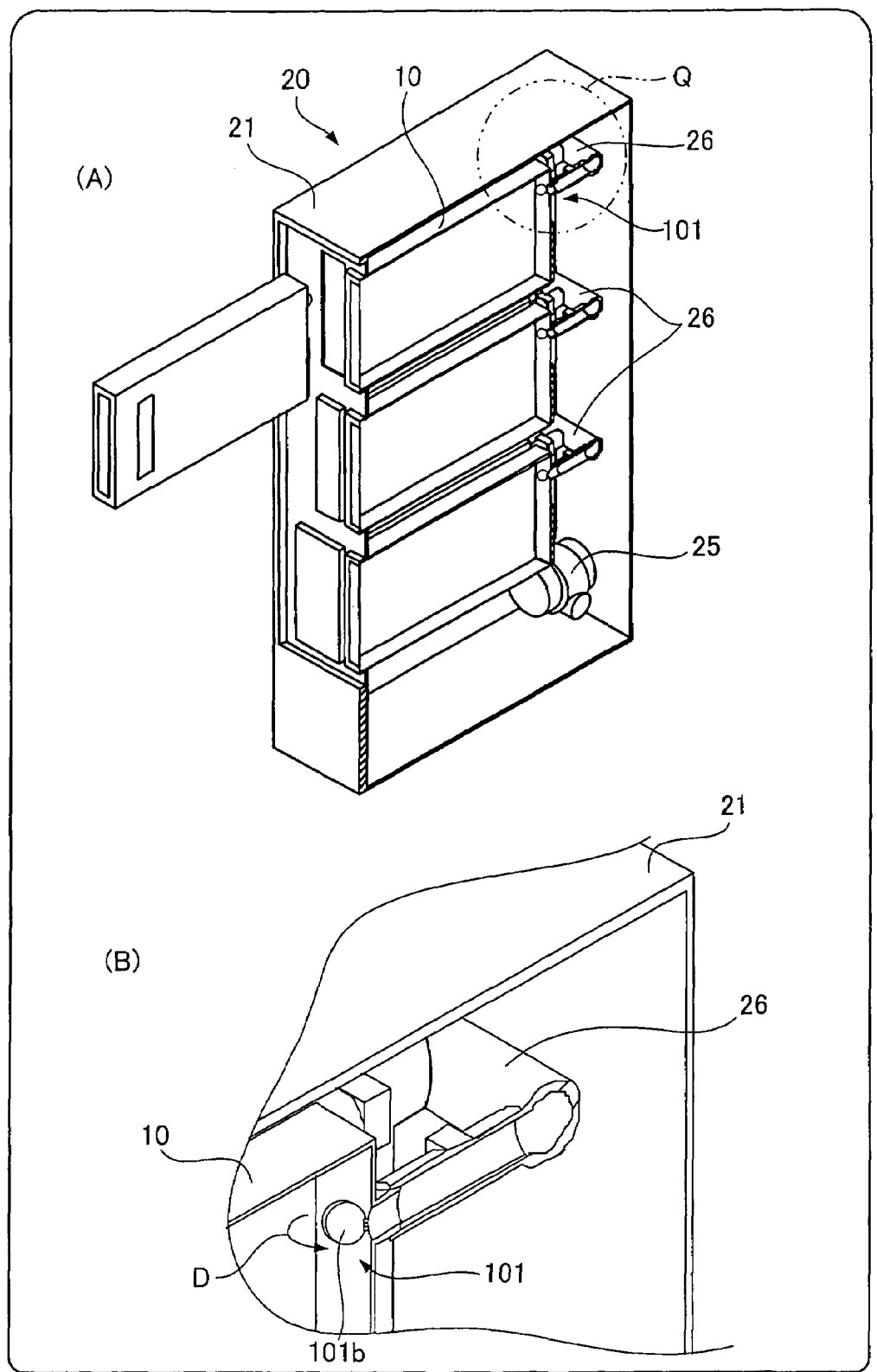
FIG. 5 is a sectional view showing the internal structure of a collective system shown in FIG. 1.

FIG. 5 is a sectional view showing the internal structure of the collective system shown in FIG. 1.

The sectional view shown in Part (A) of FIG. 5 shows a blower 25 provided for the collective system 20 and a pipe 26 that leads the air sent by the blower 25 to the inflow section 101 of each blade apparatus 10. Part (B) of FIG. 5 shows an enlarged sectional view of a range Q surrounded by a chain double-dashed line. In these figures, the filter equipped on the inflow section 101 is not shown for convenience of description.

Here, the section constituted by the blower 25 and the pipe 26 corresponds to an example of the blower system according to the present invention.

In this embodiment, when the blade apparatus 10 is contained in the system housing 21, the inflow section 101 is connected to a corresponding portion of the pipe 26. Then, the air sent from the blower 25 goes through the pipe 26 and then flows into the blade apparatus 10 from the inflow section 101.

The inflow section 101 is provided with the opening/closing valve 101*b*. This opening/closing valve 101*b* opens and closes in the direction denoted by an arrow D. When the inflow section 101 is connected to the pipe 26, it opens the inflow section 101, and when the inflow section 101 is disconnected from the pipe 26, it closes the inflow section 101. Thereby, when the blade apparatus 10 is removed from the system housing 21 during maintenance, for example, ingress of dust from the inflow section 101 can be suppressed.

Figure 6:
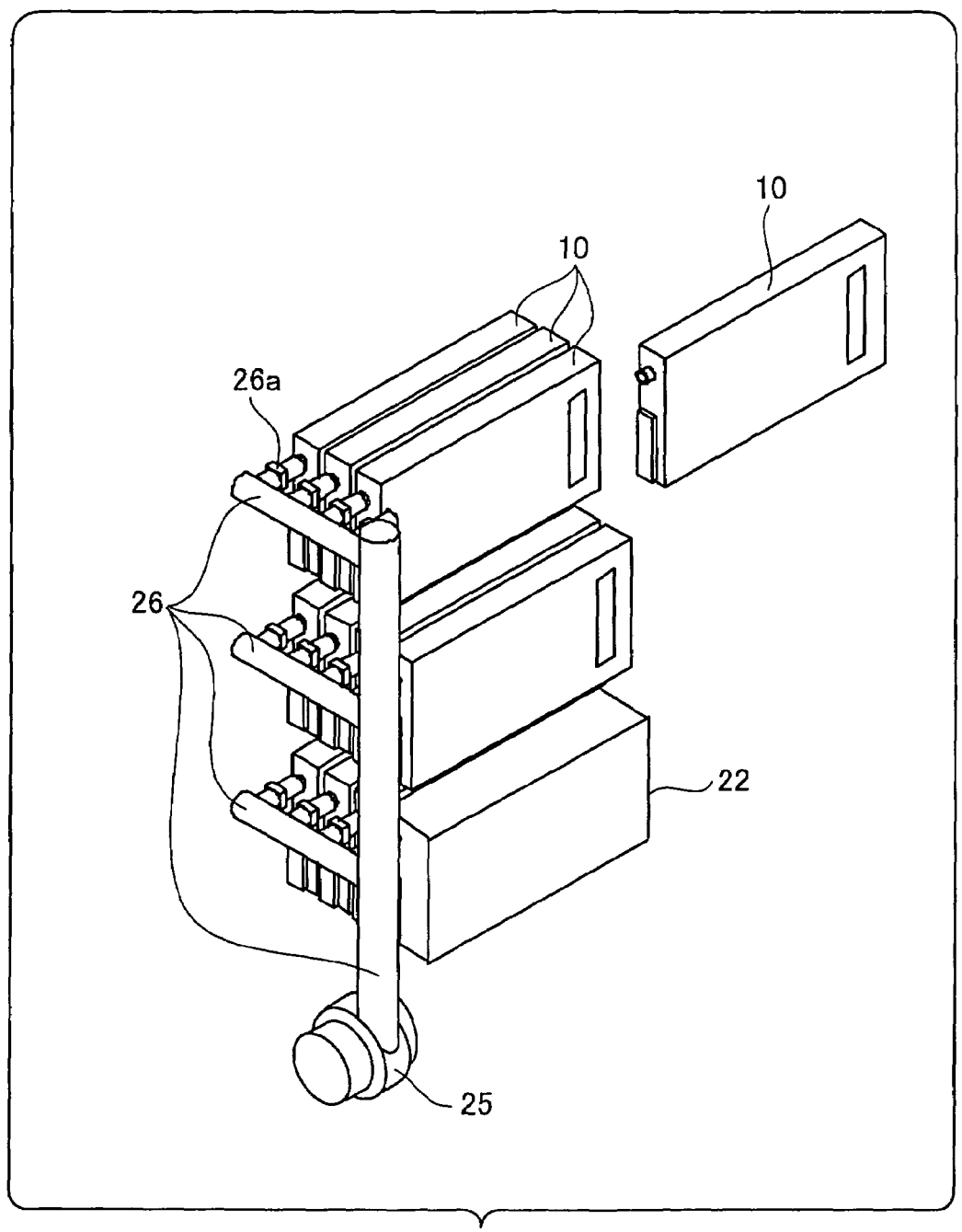
FIG. 6 is a perspective view showing the internal structure of the collective system shown in FIG. 1.

FIG. 6 is a perspective view showing the internal structure of the collective system shown in FIG. 1.

FIG. 6 shows the blower 25, the pipe 26 and the multiple blade apparatuses 10 connected to the pipe 26, which are also shown in FIG. 5, when seen from the pipe 26 side.

Here, the pipe 26 is provided with an opening/closing valve 26*a* at the connecting section to be connected to each blade apparatus 10. When the blade apparatus 10 is connected to a corresponding connecting section, the opening/ closing valve 26a opens the air outflow port of the connecting section. When the blade apparatus is not connected to the connecting section, it closes the air outflow port. Thereby, it is possible to suppress ingress of dust into the pipe 26 from the air outflow port of a connecting section to which a blade apparatus 10 is not connected.

A second embodiment of the present invention will be now described.

In comparison with the first embodiment of the present invention in which a blower is provided on the system housing side and air sent by the blower flows into each blade apparatus via a pipe, the second embodiment of the present invention is different in that each blade apparatus is provided with a blower. Except for this difference, the configuration and functions of the collective system and the blade apparatus of the second embodiment of the present invention are identical to those in the first embodiment of the present invention described with reference to FIGS. 1 to 6. Therefore, the second embodiment of the present invention will be described only with regard to the difference, and description of the other points common to the first embodiment of the present invention will be omitted here.

Figure 7:
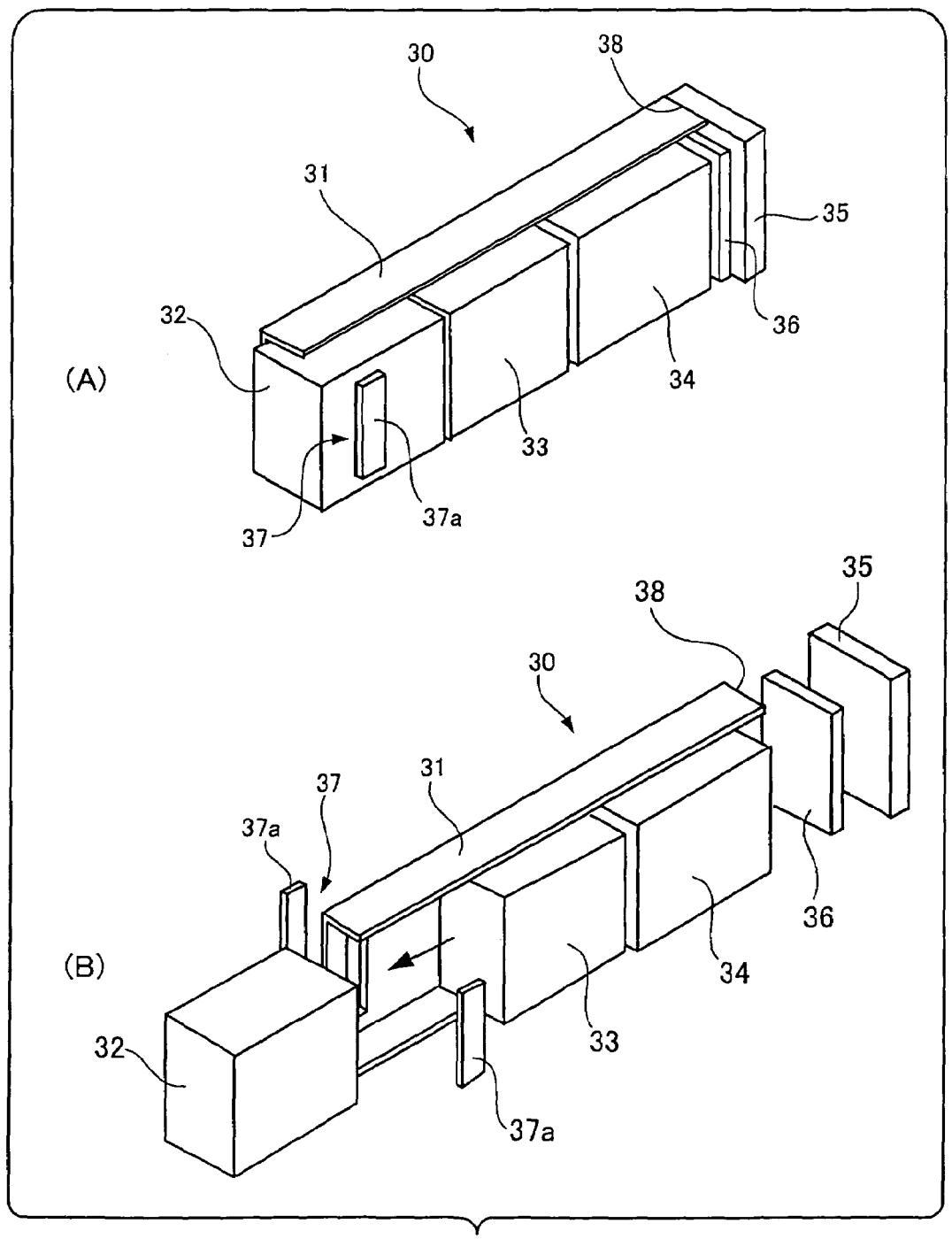
FIG. 7 shows a second embodiment of the optical information storage apparatus of the present invention.

FIG. 7 shows the second embodiment of the optical information storage apparatus of the present invention.

Part (A) of FIG. 7 shows a blade apparatus 30 for which MO disks are used as an example of the optical storage medium of the present invention, similarly to the first embodiment of the present invention. Here, Part (A) of FIG. 7 shows a blade housing 31 with almost a half thereof omitted so that the inside of the blade apparatus 30 can be seen. The blade apparatus 30 has a magazine 32 in which multiple MO disks are contained and a drive 34 for performing recording and reproduction of information on and from an MO disk, in the blade housing 31. Between the magazine 32 and the drive 34, there is provided a changer 33 for moving an MO disk between the magazine 32 and the drive 34. Here, the internal structures of the magazine 32, the changer 33 and the drive 34 are identical to those of the magazine 12, the changer 15 and the drive 16 in the first embodiment of the present invention, respectively, which have been described with reference to FIG. 3. Accordingly, each of these elements is schematically shown as a cuboid in Part (A) of FIG. 7.

In the blade apparatus 30, there is arranged a blower 35 on the side of the drive 34 opposite to the changer 33 side, and between the blower 35 and the drive 34, there is arranged a filter 36. Here, in the second embodiment of the present invention shown in Part (A) of FIG. 7, a connecting section 38 of the blade housing 31 to be connected to the blower 35 is an example of the inflow section according to the present invention. In this second embodiment, dust is removed by the filter 36 from the air that is constantly sent from the blower 35 so that the air becomes clean. The blade housing 31 is always filled with this clean air. As a result, positive pressure is constantly kept inside the blade 31 by the clean air. Thereby, it is possible to suppress ingress of dust into the blade apparatus 30 from the gap and the like of each section of the blade apparatus 30.

Furthermore, the air sent from the blower 35 flows from the drive 34 to the magazine 32 in the blade housing 31 and flows out from an outflow section 37 provided on a side surface of the blade housing 31 and near to the magazine 32. The outflow section 37 is provided with a detachable filter 37a. Even if the operation of the blower 35 stops and the air flow from the outflow section 37 toward the outside stops, for example, ingress of dust from the outflow section 37 can be suppressed by the filter 37a. In this embodiment, similarly to the first embodiment, there is also a possibility that dust enters the blade apparatus 30 and adheres to an optical system including an MO disk and the drive 34 when the magazine 32 is released or inserted. However, due to the air flow generated in the blade housing 31 by the blower 35, adhesion of dust to the optical system can be suppressed. Furthermore, by means of this air flow, each section of the magazine 32, the changer 33 and the drive 34 can be cooled.

Part (B) of FIG. 7 is a disassembled perspective view in which the blade apparatus 30 is longitudinally taken apart. The view in Part (B) also shows the blade housing 31 with almost a half thereof omitted, so that the inside of the blade apparatus 30 can be seen. In this embodiment, the filter 37a equipped on the outflow section 37 is detachable from the outside of the blade apparatus 30, and the filter 36 arranged between the blower 35 and the drive 34 can be detached by removing the blower 35. Accordingly, these filters can be periodically replaced with new ones.

The description of the embodiments of the present invention has been completed.

In the first and second embodiments, an MO disk is shown as an example of the optical storage medium according to the present invention. However, the optical storage medium according to the present invention may be a DVD or the like.

In the first embodiment, there is shown a system that one blower supplies air to each of multiple blade apparatuses via a pipe, as an example of the blower system according to the present invention. However, the blower system according to the present invention may be a system provided with multiple blowers.

The invention claimed is:

1. An optical information storage system comprising:
a plurality of optical information storage apparatuses, each of which comprising a media storing section in which is plurally contained a disk-like optical storage medium on which recording and reproduction of information is possible and at least information reproduction is performed by means of light, a recording/reproducing section that records and/or reproduces information on and/or from the optical storage medium, a medium moving section that moves the optical storage medium between the media storing section and the recording/reproducing section, a blade housing that integrally holds the media storing section, the medium moving section and the recording/reproducing section arranged in line therein, an inflow section that is provided on an end part on the recording/reproducing section side of the blade housing and allows air to flow in from outside the blade housing, a filter that suppresses ingress of dust via the inflow section, and an outflow section that is provided on an end part on the media storing section side of the blade housing and allows air flowing from the recording/reproducing section toward the media storing section in the blade housing to flow to outside the blade housing;
a system housing that contains the plurality of optical information storage apparatuses and detachably holds the plurality of optical information storage apparatuses;
a control section that controls recording and/or reproduction of information on each of the plurality of optical information storage apparatuses contained in the system housing;
a blower that sends air; and
a pipe that leads the air sent by the blower to the inflow section of each of the plurality of optical information storage apparatuses contained in the system housing.

2. The optical information storage system according to claim 1, wherein the optical information storage apparatus comprises an opening and closing section that closes the inflow section when the optical information storage apparatus is removed from the system housing and opens the inflow section when the optical information storage apparatus is contained in the system housing.

3. The optical information storage system according to claim 1, wherein the optical information storage apparatus comprises a filter that suppresses ingress of dust into the blade housing via the outflow section.

4. An optical information storage apparatus that records and/or reproduces information to and/or from a disk-like optical storage medium on which recording and reproduction of information is possible and at least information reproduction is performed by means of light, the optical information storage apparatus comprising:

a media storing section in which a disk-like optical storage medium is plurally contained;

a recording/reproducing section that records and/or reproduces information on and/or from the optical storage medium;

a medium moving section that moves the optical storage medium between the media storing section and the recording/reproducing section;

a blade housing that integrally holds the media storing section, the medium moving section and the recording/reproducing section arranged in line therein;

a connecting section that detachably connects the optical information storage apparatus to a system housing in which a plurality of the optical information storage apparatuses are contained;

an inflow section that is provided on an end part on the recording/reproducing section side of the blade housing and allows air to flow in from outside the blade housing;

a filter that suppresses ingress of dust via the inflow section; and an outflow section that is provided on an end part on the media storing section side of the blade housing and allows air flowing from the recording/reproducing section toward the media storing section in the blade housing to flow out.

5. The optical information storage apparatus according to claim 4, wherein the system housing comprises a blower system that sends air to the inflow section of each of the plurality of optical information storage apparatuses contained in the system housing, wherein the inflow section is detachably connected to the blower system, and wherein the optical information storage apparatus comprises an opening and closing section that closes the inflow section when the inflow section is disconnected from the blower system and opens the inflow section when the inflow section is connected to the blower system.

6. The optical information storage apparatus according to claim 4, comprising a blower that sends air to the inflow section.

7. The optical information storage apparatus according to claim 4, comprising a filter that suppresses ingress of dust into the blade housing via the outflow section.

* * * * *